United States Patent
Saeedkia et al.

(10) Patent No.: US 9,222,829 B2
(45) Date of Patent: Dec. 29, 2015

(54) ENCLOSURE WITH INTEGRATED TERAHERTZ PHOTOCONDUCTIVE ANTENNA AND TERAHERTZ LENS

(71) Applicant: TETECHS INC., Waterloo (CA)

(72) Inventors: Daryoosh Saeedkia, Waterloo (CA); David Biesty, Waterloo (CA)

(73) Assignee: TeTechS Inc., Waterloo, Ontario (CA)

( * ) Notice: Subject to any disclaimer, the term of this patent is extended or adjusted under 35 U.S.C. 154(b) by 0 days.

(21) Appl. No.: 14/408,309

(22) PCT Filed: Jun. 19, 2013

(86) PCT No.: PCT/CA2013/000589
§ 371 (c)(1),
(2) Date: Dec. 16, 2014

(87) PCT Pub. No.: WO2013/188962
PCT Pub. Date: Dec. 27, 2013

(65) Prior Publication Data
US 2015/0204717 A1    Jul. 23, 2015

Related U.S. Application Data

(60) Provisional application No. 61/661,803, filed on Jun. 19, 2012.

(51) Int. Cl.
*G01J 1/04*     (2006.01)
*H04B 10/80*    (2013.01)
(Continued)

(52) U.S. Cl.
CPC ............ *G01J 1/0411* (2013.01); *G02B 6/4212* (2013.01); *G21K 5/02* (2013.01); *H04B 10/80* (2013.01); *G02F 2203/13* (2013.01)

(58) Field of Classification Search
CPC ............ G01N 21/3581; G01N 21/3586; G01J 1/0411; G21K 5/02; G02B 6/4212
USPC ....................................................... 250/341.1
See application file for complete search history.

(56) References Cited

U.S. PATENT DOCUMENTS

| 6,816,647 | B1 | 11/2004 | Rudd et al. | |
| 2005/0056785 | A1* | 3/2005 | Chou et al. | 250/338.1 |

(Continued)

OTHER PUBLICATIONS

International Searching Authority, International Search and Written Opinion for PCT/CA2013/000589, mailed Sep. 16, 2013.

(Continued)

*Primary Examiner* — Marcus Taningco
(74) *Attorney, Agent, or Firm* — Bereskin + Parr LLP (57) ABSTRACT

An apparatus for transmitting or receiving terahertz waves includes an enclosure having a front opening, a rear opening, and an internal passageway therebetween. The enclosure includes an antenna mounting structure and a lens mounting structure. A terahertz photoconductive antenna is mounted within the enclosure against the antenna mounting structure. The terahertz photoconductive antenna has a rear side for being optically energized by an optical beam passing through the rear opening of the enclosure, and a front side for transmitting or receiving the terahertz waves through the front opening. A terahertz lens is mounted within the enclosure against the lens mounting structure. The terahertz lens is positioned between the front opening and the terahertz photoconductive antenna for converging the terahertz waves being transmitted or received. The antenna mounting structure and the lens mounting structure are configured to optically align the terahertz photoconductive antenna and the terahertz lens.

19 Claims, 10 Drawing Sheets

(51) Int. Cl.
*G02B 6/42* (2006.01)
*G21K 5/02* (2006.01)

(56) References Cited

U.S. PATENT DOCUMENTS

2007/0235650 A1  10/2007  Federici et al.
2010/0155605 A1*  6/2010  Choi et al. .................. 250/347
2011/0205618 A1  8/2011  Holzwarth et al.

OTHER PUBLICATIONS

Exter et al. "Characterization of an optoelectronic terahertz beam system". IEEE Transactions on Microwave Theory and Techniques, 38, No. 11, pp. 1684-1691, Nov. 1990.

Federici et al. "Review of terahertz and subterahertz wireless communications" Journal of Applied Physics, 107, pp. 111101-01 to 111101-22, Jun. 9, 2010.

* cited by examiner

ENCLOSURE WITH INTEGRATED TERAHERTZ PHOTOCONDUCTIVE ANTENNA AND TERAHERTZ LENS

RELATED APPLICATIONS

This application claims the benefit of U.S. Provisional Patent Application Ser. No. 61/661,803 filed on Jun. 19, 2012, and entitled "Enclosure Package Design for Terahertz Photoconductive Antennas", the entire contents of which are hereby incorporated by reference herein for all purposes.

TECHNICAL FIELD

The disclosure herein relates to apparatus for transmitting or detecting terahertz waves, and in particular, to an enclosure with a terahertz photoconductive antenna, terahertz lens, and other optical components mounted within the enclosure.

BACKGROUND

Terahertz photoconductive antennas (THz-PCAs) are used to generate or receive terahertz (THz) signals such as broadband terahertz pulses and narrowband terahertz continuous waves. After being demonstrated as practical THz sources and detectors, THz-PCAs have been the subject of a significant amount of scientific and industrial reports investigating their applications as terahertz wave transmitters and receivers.

Narrowband terahertz continuous waves can be generated using two continuous-wave laser beams that are selected to provide a frequency difference in the THz range. The laser beams are combined inside an optical fiber or overlapped in free-space and subsequently mixed in a photomixer (e.g. a photo-absorbing medium) to generate a THz wave. In some cases, THz waves having a frequency line width of as low as a few KHz can be generated using this technique.

Broadband terahertz pulses can be generated by exciting a THz-PCA with a femto-second short pulse laser. For example, when using a femto-second laser with an optical pulse duration of about 100-fs it is possible to generate THz pulses having a frequency content of up to about 5-THz, and an average power of a few micro-watts.

In addition to generating THz waves, THz-PCAs are also capable of detecting THz waves. For example, optoelectronic techniques can be used to detect and extract both amplitude and phase information of a THz wave incident on an optically gated THz-PCA. In this case, a gating laser beam is applied using a short pulse laser, or a pair of continuous-wave lasers having a frequency difference selected to be equal to the frequency of the incident terahertz wave. The THz wave and gating laser beam applied to the THz-PCA generate a photocurrent, which is generally proportional to the amplitude of the incident terahertz wave.

In conventional THz systems, one side of the THz-PCA is excited by one or more laser beams that pass through free-space to a focusing lens. Furthermore, a hyper-hemispherical silicon lens is positioned on the other side of the THz-PCA for collimating the THz signal being generated or detected. In practice, the THz-PCA and hyper-hemispherical silicon lens are mounted on two separate X-Y translation stages for maintaining optical alignment of the silicon lens, THz-PCA, and focusing lens. The X-Y translation stage typically includes a base and a platform slidably mounted to the base for supporting and moving the THz-PCA or the silicon lens. Unfortunately, these X-Y translations stages are cumbersome to operate and increase overall system complexity, thus making it difficult to calibrate and use the THz-PCA.

Accordingly, there is a need for a new apparatus for transmitting or receiving terahertz waves.

SUMMARY

According to some embodiments, there is provided a design for an enclosure packaging, to package a THz-PCA with a terahertz lens in a single integrated unit. The enclosure package houses the THz-PCA with the terahertz lens attached to the back side of the THz-PCA chip. The laser beam can be delivered to the THz-PCA through free-space or through a fiber optic coupler.

In the case of free-space laser beam delivery, a separate optical lens may be used to focus the laser beam on the THz-PCA. In some cases the optical lens can be integrated with the enclosure package.

In the case of fiber optic laser beam delivery, small optical lenses and an optical fiber may be integrated with the enclosure package. The optical fiber may have a focusing lens structure on its tip.

According to some embodiments, there is an apparatus for transmitting or receiving terahertz waves. The apparatus includes an enclosure having a front opening, a rear opening, and an internal passageway therebetween. The enclosure includes an antenna mounting structure and a lens mounting structure. A terahertz photoconductive antenna is mounted within the enclosure against the antenna mounting structure. The terahertz photoconductive antenna has a rear side for being optically energized by an optical beam passing through the rear opening of the enclosure, and a front side for transmitting or receiving the terahertz waves through the front opening. A terahertz lens is mounted within the enclosure against the lens mounting structure. The terahertz lens is positioned between the front opening and the terahertz photoconductive antenna for converging the terahertz waves being transmitted or received. The antenna mounting structure and the lens mounting structure are configured to optically align the terahertz photoconductive antenna and the terahertz lens.

In some embodiments, the apparatus may include a position adjustment device for optically aligning the terahertz photoconductive antenna and the terahertz lens. The position adjustment device may include a plurality of set screws for adjustably positioning the antenna mounting structure within the enclosure. Similarly, the position adjustment device may include a plurality of set screws for adjustably positioning the lens mounting structure within the enclosure.

The terahertz photoconductive antenna may include a terahertz chip dye mounted to a circuit board. Furthermore, the antenna mounting structure and the lens mounting structure may be configured to position the terahertz lens in contact with the terahertz chip dye.

The enclosure may include a tubular main body with a front portion. The antenna mounting structure and the lens mounting structure may be located within the front portion of the tubular main body with the lens mounting structure being located forwardly of the antenna mounting structure.

The antenna mounting structure may have a cylindrical shape with a longitudinal passageway and a recessed front portion for receiving the circuit board. The lens mounting structure may have a cylindrical shape with a longitudinal passageway and a beveled rear inner wall for holding the terahertz lens against the terahertz chip dye. The apparatus may include an O-ring between the beveled rear inner wall of the lens mounting structure and the terahertz lens.

The tubular main body may have an inner annular flange for supporting the antenna mounting structure. The apparatus may also include a front lock ring for securing the lens mounting structure and the antenna mounting structure between the front lock ring and the inner annular flange of the tubular main body.

The apparatus may include an optical focusing lens assembly mounted within the enclosure for directing the optical beam onto the terahertz photoconductive antenna. The optical focusing lens assembly may be movable lengthwise within the enclosure for providing an adjustable distance between the optical focusing lens assembly and the terahertz photoconductive antenna. For example, the enclosure may include a tubular main body with a rear portion having internal threads, and the optical focusing lens assembly may have a tubular lens housing with external threads for engaging the internal threads of the tubular main body so as to allow lengthwise movement.

The apparatus may also include a middle lock ring and a rear lock ring for securing the optical focusing lens assembly in place within the tubular main body.

The optical focusing lens assembly may include an optical focusing lens, and a retaining ring for securing the optical focusing lens to the tubular lens housing. The apparatus may also include a fiber optic coupler mounted to the tubular lens housing for receiving a fiber optic cable that supplies the optical beam through the optical focusing lens and onto the terahertz photoconductive antenna. The fiber optic coupler may include a collimating lens for collimating the optical beam onto the optical focusing lens.

The apparatus may include a fiber optic coupler mounted to the enclosure for receiving a fiber optic cable that supplies the optical beam directed onto the terahertz photoconductive antenna.

The apparatus may include at least one electrical connector for connecting the circuit board of the terahertz photoconductive antenna to an external electrical device.

In some embodiments, the enclosure may include a main body having a rear recessed portion defining the antenna mounting structure, and a front recessed portion defining the lens mounting structure. The enclosure may also include a front cover for holding the terahertz lens against the front recessed portion of the main body. The front cover generally has a front opening therethrough. The apparatus may also include an O-ring located between the front cover and the terahertz lens.

The circuit board of the terahertz photoconductive antenna may be secured to the main body using a plurality of fasteners.

The front cover may be secured to the main body using a plurality of fasteners.

The enclosure may include a rear cover secured to the main body using a plurality of fasteners. The rear cover general has a rear opening therethrough.

The rear opening in the rear cover may have internal threads configured for attachment to an optical instrument.

The apparatus may include a fiber optic cable mounted to the rear cover for directing the optical beam onto the terahertz chip dye. The apparatus may include a strain relief member for attaching the fiber optic cable to the rear cover.

The fiber optic cable may include an optical fiber, and a rigid jacket wrapped around the optical fiber. The optical fiber may have a tapered tip. The fiber optic cable may further include a ferrule between the rigid jacket and the tapered tip. The tapered tip of the optical fiber may be spaced apart from the terahertz chip dye.

Other aspects and features of the invention will become apparent, to those ordinarily skilled in the art, upon review of the following description of some exemplary embodiments.

BRIEF DESCRIPTION OF THE DRAWINGS

Some embodiments of the present specification will now be described, by way of example only, with reference to the following drawings, in which.

DETAILED DESCRIPTION

Figure 1:
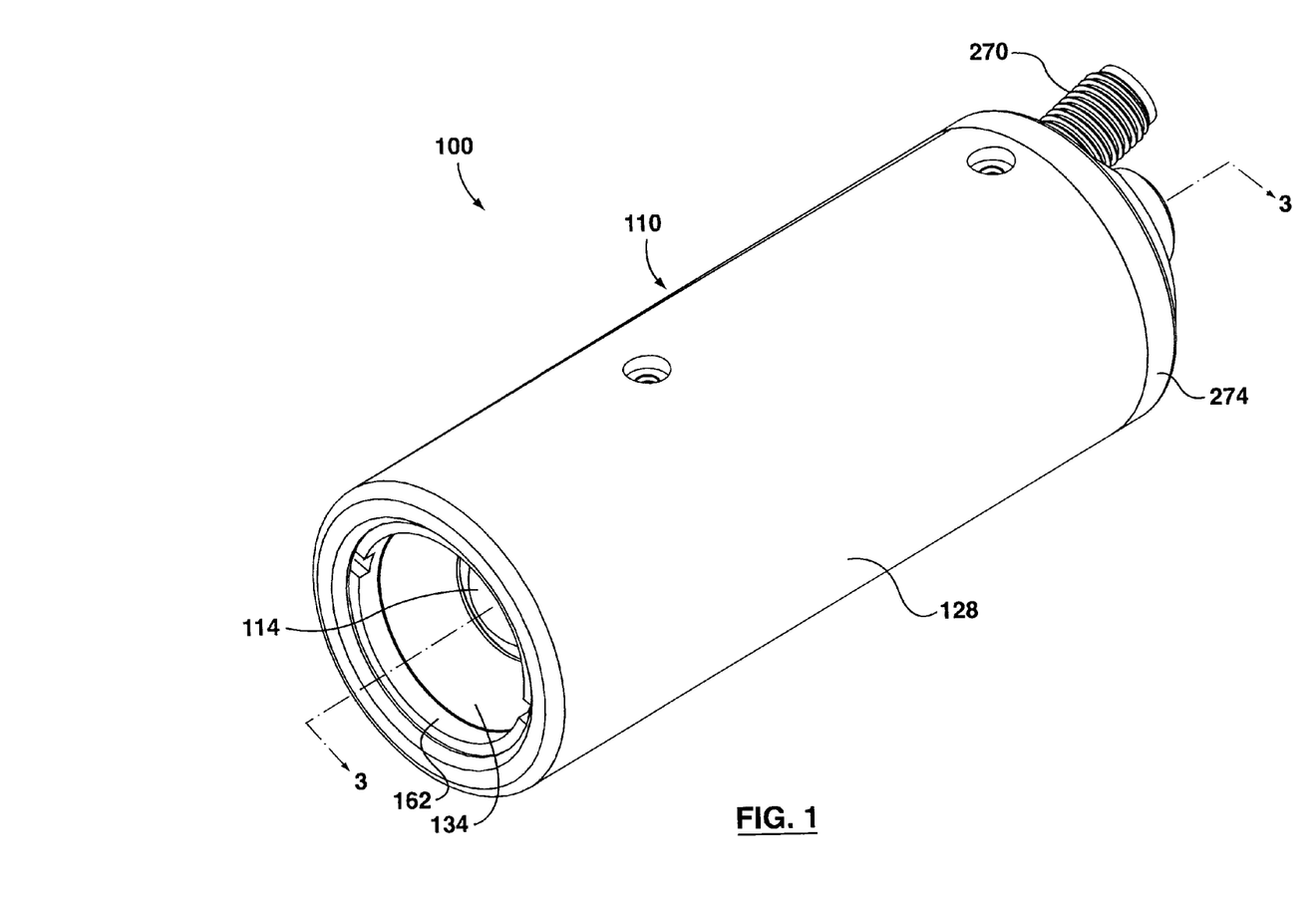
FIG. 1 is a front perspective view of an apparatus for transmitting or receiving terahertz waves according to one embodiment.
Figure 2:
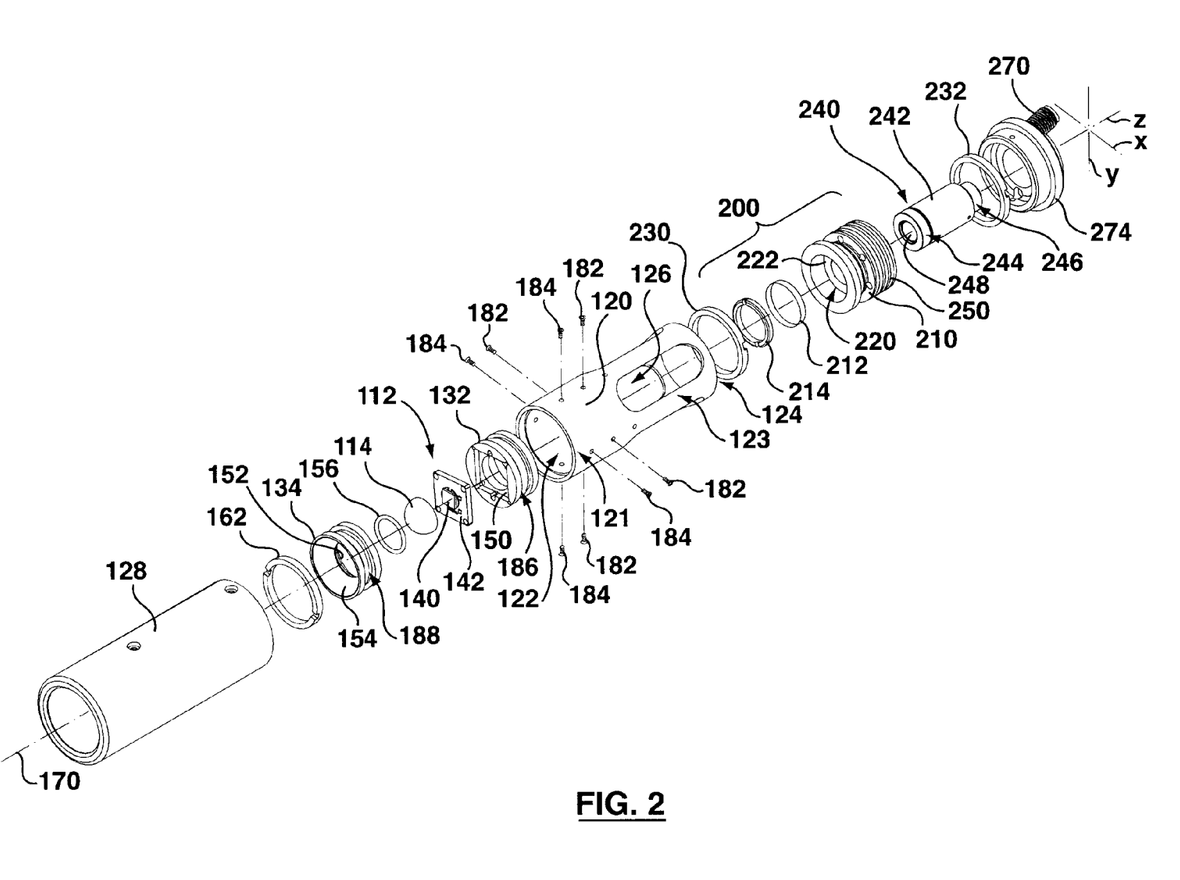
FIG. 2 is an exploded front perspective view of the apparatus of FIG. 1.
Figure 3:
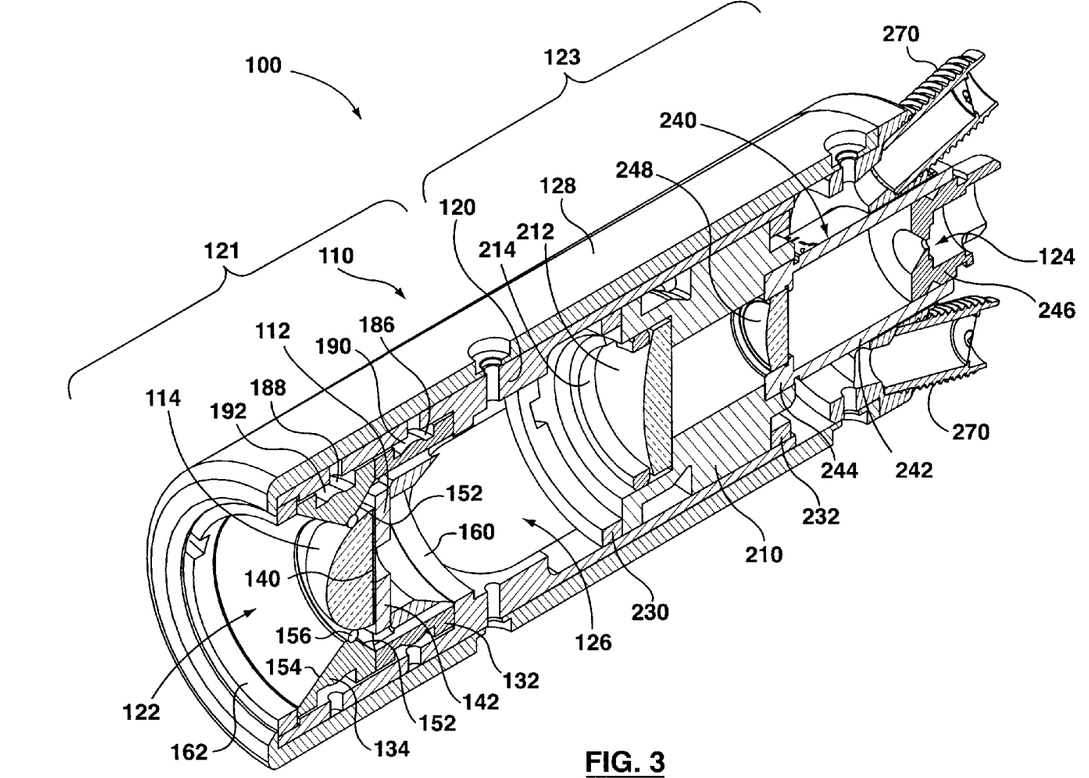
FIG. 3 is a cross-sectional perspective view of the apparatus of FIG. 1 along the line 3-3.

Referring to FIGS. 1-3, illustrated therein is an apparatus 100 for transmitting or receiving terahertz waves made in accordance with an embodiment of the present invention. As shown in FIG. 2, the apparatus 100 includes an enclosure 110, a terahertz photoconductive antenna 112 mounted within the enclosure 110 for transmitting or receiving terahertz waves, and a terahertz lens 114 mounted within the enclosure 110 for collimating or converging the terahertz waves being transmitted or received.

As shown in FIG. 2, the enclosure 110 includes a tubular main body 120 having a front portion 121 with a front opening 122, a rear portion 123 with a rear opening 124, and an internal passageway 126 that extends between the front opening 122 and the rear opening 124. The enclosure 110 also includes a sleeve 128 that covers the main body 120. The enclosure 110 may be made from aluminum, which may provide strength and light weight. The enclosure 110 could also be made from other materials such as other metals, plastics, and the like.

The enclosure 110 also includes an antenna mounting structure 132 for mounting the terahertz photoconductive antenna 112 within the internal passageway 126, and a lens mounting structure 134 for mounting the terahertz lens 114 within the internal passageway 126. In the illustrated embodiment, the antenna mounting structure 132 and the lens mounting structure 134 are separate pieces mounted within the tubular main body 120 and are generally cylindrical in shape with longitudinal passageways therethrough.

Referring still to FIG. 2, the terahertz photoconductive antenna 112 includes a terahertz chip dye 140 mounted to a circuit board 142 such as a printed circuit board (PCB). The terahertz chip dye 140 is generally a highly resistive thin film semi-conductor and may be epitaxially grown on an InGaAs—InAlAs substrate, a GaAs substrate, or another substrate. The terahertz chip dye 140 generally includes an antenna structure such as a short or long dipole configuration, a spiral configuration, a large periodic array configuration, and the like. The terahertz chip dye 140 may be attached to the circuit board 142 using an electrically conductive epoxy such as silver epoxy or using wire bonding. This secures the terahertz chip dye 140 in place and connects the antenna structure to respective positive and negative electrical contacts on the circuit board 142.

The terahertz photoconductive antenna 112 has a rear side for being optically energized by an optical beam passing through the rear opening 124 of the enclosure 110, and a front side for transmitting or receiving the terahertz waves through the front opening 122 of the enclosure 110. Furthermore, the circuit board 142 has an aperture aligned with terahertz chip dye for allowing the optical beam to impinge the terahertz chip dye 140.

When transmitting terahertz waves from the terahertz photoconductive antenna 112, a voltage is applied across the positive and negative electrical contacts on the circuit board 142, and an optical beam is directed on the rear side of the terahertz dye 140. The optical beam generates mobile carriers across the terahertz chip dye 140 and results in an electrical pulse having a terahertz frequency, which in turn emits a terahertz wave from the front side of the terahertz photoconductive antenna 112.

When receiving terahertz waves impinging the terahertz photoconductive antenna 112, an optical beam is directed on the rear side of the terahertz dye 140, and an incident terahertz wave impinging the front side of the terahertz dye 140 energizes the antenna structure. This produces an electrical signal across the positive and negative electrical contacts on the circuit board 142, which can be measured to determine characteristics of the terahertz wave. In some cases, a current amplifier may amplify the electrical signal produced as will be described later below.

As described above, the terahertz lens 114 is generally configured to converge the terahertz waves being transmitted or received by the terahertz photoconductive antenna 112. For example, when operating as a transmitter, the terahertz lens 114 collimates the terahertz waves emitted from the terahertz photoconductive antenna 112. Alternatively, when operating as a receiver, the terahertz lens 114 focuses the terahertz waves onto the terahertz photoconductive antenna 112. In either case, the terahertz waves tend to converge.

The terahertz lens 114 may have a refractive index similar to that of the terahertz photoconductive antenna 112. More specifically, the terahertz lens 114 may be made from silicon when the terahertz chip dye 140 is made from GaAs. This may reduce refraction of terahertz waves transmitted between the terahertz chip dye 140 and the terahertz lens 114.

As shown in the illustrated embodiment, the terahertz lens 114 may have a hemispherical shape, and in particular, a hyper-hemispherical shape. This can help collimate or converge the terahertz waves. In some embodiments, the terahertz lens 114 may have a diameter of about 10-mm; however, larger or smaller diameter lenses could be used. In other embodiments, the terahertz lens 114 may have other configurations such as a bullet-shaped lens.

In some embodiments, the terahertz lens 114 may be configured to be aplanatic, which may help reduce aberrations. In certain circumstances, a silicon hyper-hemispherical terahertz lens 114 as describe above may provide aplanatic functionality.

As described above, the terahertz photoconductive antenna 112 is mounted within the enclosure 110 against the antenna mounting structure 132, and the terahertz lens 114 is mounted within the enclosure 110 against the lens mounting structure 134. More specifically, as shown, the lens mounting structure 134 is located within the front portion 121 of the tubular main body 120 forwardly of the antenna mounting structure 132. Thus, the terahertz lens 114 is located within the enclosure 110 forwardly of the terahertz photoconductive antenna 112.

In some embodiments, the antenna mounting structure 132 and the lens mounting structure 134 may be configured to position the terahertz lens 114 in contact with the terahertz chip dye 140. For example, as shown in FIG. 2, the antenna mounting structure 132 may have a cylindrical shape with a recessed front portion 150 for receiving the circuit board 142. The circuit board 142 may be secured in place using fasteners such as screws (not shown).

As shown in FIG. 3, the lens mounting structure 134 has a cylindrical shape with an opening smaller than the diameter of the terahertz lens 114. Furthermore, the lens mounting structure 134 has a beveled rear inner wall 152 for holding the terahertz lens 114 against the terahertz chip dye 140. The apparatus 100 may also include an O-ring 156 located between the beveled rear inner wall 152 and the terahertz lens 114. The lens mounting structure 134 may also have a conical front inner wall 154 opposite the beveled rear inner wall 152.

The antenna mounting structure 132 and the lens mounting structure 134 may be secured within the enclosure 110 using a number of techniques. For example, as shown in FIG. 3, the tubular main body 120 may have an inner annular flange 160 for supporting the antenna mounting structure 132. Furthermore, the apparatus 100 may include a front lock ring 162 for securing the lens mounting structure 134 and the antenna mounting structure 132 between the front lock ring 162 and the inner annular flange 160. The lock ring 162 may be held in place using fasteners (not shown) such as screws, clips, and the like. The lock ring 162 could also be held in place using external threads that engage corresponding internal threads on the main body 120.

Referring now to FIG. 2, the antenna mounting structure 132 and the lens mounting structure 134 are configured to optically align the terahertz photoconductive antenna and the terahertz lens. For example, the apparatus 100 may include one or more position adjustment devices for optically aligning the terahertz lens 114 and the terahertz photoconductive antenna 112 along an optical axis 170. As shown, the position adjustment device may include set screws 182, 184 for adjusting the position of the terahertz lens 114 or the terahertz photoconductive antenna 112. More particularly, in the illustrated embodiment, the position adjustment device includes a plurality of first set screws 182 for adjustably positioning the lens mounting structure 134 within the tubular main body 120, and a plurality of second set screws 184 for adjustably positioning the antenna mounting structure 132 within the tubular main body 120.

The set screws 182, 184 extend through threaded openings on the main body 120 and engage corresponding surfaces on the antenna mounting structure 132, and the lens mounting structure 134. For example, the first set screws 182 are distributed circumferentially around the main body 120 and engage an annular recessed portion 186 that extends around the outer circumferential surface of the antenna mounting structure 132. The position of the antenna mounting structure 132 can be adjusted along a plane perpendicular to the optical axis 170 by screwing the first set screws 182 inward or outward relative to the annular recessed portion 186. In other words, the first set screws 182 can adjust the X-Y position of the antenna mounting structure 132 so as to align the terahertz photoconductive antenna 112 with the terahertz lens 114.

Similar to the first set screws 182, the second set screws 184 are distributed circumferentially around the main body 120 and engage an annular recessed portion 188 that extends around the outer circumferential surface of the lens mounting structure 134. The position of the lens mounting structure 134 can be adjusted along a plane perpendicular to the optical axis 170 by screwing the second set screws 184 inward or outward relative to the annular recessed portion 188. In other words, the second set screws 184 can adjust the X-Y position of the lens mounting structure 134 so as to align the terahertz lens 114 with the terahertz photoconductive antenna 112.

As shown in FIG. 3, the annular recessed portions 186, 188 may include convex protrusions 190, 192, respectively. This may provide a single point of contact between the set screws 182, 184 and the respective convex protrusions 190, 192, which can enable fine positional adjustments without significant binding. While both sets of the set screws 182, 184 are shown in the illustrated embodiment, the apparatus 100 it is possible to use only one set of set screws 182, 184 when optically aligning the terahertz lens 114 and the terahertz photoconductive antenna 11. Nevertheless, using both sets of set screws 182, 184 can be beneficial when aligning both the terahertz photoconductive antenna 112 and the terahertz lens 114 with a third optical component such as an optical focusing lens assembly 200 mounted within the enclosure, which will be described below.

In other embodiments, the apparatus 100 may include other position adjustment devices. For example, the antenna mounting structure 132 and the lens mounting structure 134 may be mounted eccentrically within the tubular main body 120. In such cases, the terahertz photoconductive antenna 112 and the terahertz lens 114 could be optically aligned by adjusting the rotational position of the antenna mounting structure 132 and the lens mounting structure 134 within the tubular main body 120.

In some embodiments, the terahertz photoconductive antenna 112 and the terahertz lens 114 may be pre-aligned during manufacture and assembly within the enclosure 110. In such cases, the position adjustment device may be omitted.

In general, the cylindrical configuration of the enclosure 110 can help to optically align the various components of the apparatus 100. For example, the cylindrical configuration allows the terahertz photoconductive antenna 112, the terahertz lens 114, and other optical components to be concentrically aligned along the central axis of the tubular main body 120.

In some embodiments, the terahertz lens 114 itself may be omitted. In such cases, the apparatus 100 may include other optical components within the enclosure 110.

Referring now to FIGS. 2 and 3, the apparatus 100 may include an optical focusing lens assembly 200 mounted within the enclosure 110 for directing the optical beam onto the terahertz photoconductive antenna 112. As shown, the optical focusing lens assembly 200 includes a lens housing 210, an optical focusing lens 212, and a retaining ring 214 for securing the optical focusing lens 212 to the lens housing 210. More specifically, as shown in FIG. 2, the lens housing 210 has a recessed front portion 220 with an annular lip 222 for supporting the optical focusing lens 212. Furthermore, the recessed front portion 220 may have an internal thread for engaging a corresponding external thread on the retaining ring 214 such that screwing the retaining ring 214 into the recessed front portion 220 presses the optical focusing lens 212 against the annular lip 222 and thereby secures it in place.

The apparatus 100 may also include a fiber optic coupler 240 mounted to the optical focusing lens assembly 200 for receiving a fiber optic cable (not shown). The fiber optic cable may supply the optical beam through the optical focusing lens 212 and onto the terahertz photoconductive antenna 112. In the illustrated embodiment, the fiber optic coupler 240 includes a housing 242 having a front portion 244 and a rear portion 246. The rear portion 246 is generally shaped to receive the fiber optic cable. The front portion 244 includes a collimating lens 248 for collimating the optical beam onto the optical focusing lens 212.

As shown, the collimating lens 248 is positioned rearward of the optical focusing lens 212, and thus, the lenses 212, 248 form a compound lens assembly. Furthermore the spacing between the optical focusing lens 212 and the terahertz photoconductive antenna 112 may be selected based upon the focal length of the focusing lens 212. For example, when the focusing lens 212 has a focal length of about 30-mm, the distance between the optical focusing lens 212 and the terahertz photoconductive antenna 112 may also be about 30 mm. Furthermore, the spacing between the focusing lens 212 and the collimating lens 248 may be about 10-mm, although this distance could be greater or smaller. The focal point of the collimating lens 248 may be selected to be located approximately at the tip of the fiber optic cable that is received through the rear opening 124 of the enclosure 110. The above-noted configuration may help collimate and then focus the optical beam onto the terahertz photoconductive antenna 112.

In some examples, the optical focusing lens assembly 200 may be movable lengthwise within the enclosure 110 for providing an adjustable distance between the optical focusing lens assembly 200 and the terahertz photoconductive antenna 112. For example, as shown in FIG. 2, the rear portion 123 of the main body 120 may have internal threads (not shown), and the lens housing 210 may have external threads 250 for engaging the internal threads on the rear portion 123 of the tubular main body 120.

By allowing lengthwise movement, it is possible to adjust the position the optical focusing lens 212, and thus, focus the optical beam on the terahertz photoconductive antenna 112, and particularly, the terahertz chip dye 140. This enables the optical beam to have an adjustable spot size on the terahertz chip dye 140, which can help transfer optical energy to the terahertz photoconductive antenna 112. In some embodiments, the internal and external threads 250 may have a fine pitch, which may allow micrometer precision adjustment to position the focal point of the optical beam on the terahertz chip dye 140.

Referring still to FIGS. 2 and 3, the apparatus 100 may include a middle lock ring 230 and a rear lock ring 232 for securing the optical focusing lens assembly 200 in place within the tubular main body 120. This may help keep the focal point aligned on the terahertz chip dye 140.

While the illustrated embodiment includes a focusing lens 212, fiber optic coupler 240, and collimating lens 248, in other embodiments, one or more of these elements may be omitted. For example, in some embodiments, the fiber optic cable may extend through the main body 120 and may be positioned near or in contact with the terahertz chip dye 140, and thus, the focusing lens 212 and collimating lens 248 may be omitted. Furthermore, the fiber optic cable may have a tapered tip, which may help focus the optical beam onto the terahertz chip dye 140 without the use of a separate focusing lens. In other embodiments, the fiber optic coupler 240 may be omitted, for example, when the terahertz photoconductive antenna 112 is energized by a free-space optical beam instead of using a fiber optic cable. In such cases, the focusing lens 212 and collimating lens 248 may still be included within the enclosure 110, or alternatively, outside the enclosure 110.

In some embodiments, it may be desirable to optically align the terahertz photoconductive antenna 112 with the optical beam. For example, when using the optical focusing assembly 200 as in the illustrated embodiment, the second set screws 184 can be used to adjust the X-Y position of the antenna mounting structure 132 to align the focal point of the focusing lens 212 on the terahertz chip dye 140.

In other embodiments, for example when using a free-space optical beam, the relative position between the enclosure 110 and the free-space optical beam may be adjusted using an external positioning device such as an X-Y translation stage in order to align the free-space optical beam with the terahertz chip dye 140.

In some embodiments, the enclosure 110 may be configured to be attached to a standard optical component. For example, the sleeve 128 may be sized and shaped to be received within a standard 1-inch diameter optical mount. Furthermore, while not shown, the sleeve 128 could have external threads for attachment to internally threaded optical mounts.

Referring now to FIG. 3, the apparatus 100 may include one or more electrical connectors 270 for connecting the terahertz photoconductive antenna 112 to one or more external electrical devices. For example, the electrical connectors 270 may be coaxial cable connectors such as Sub-Miniature Version-A (SMA) connectors. As shown, the electrical connectors 270 are mounted to an end cap assembly 274, which is secured to the sleeve 128, for example, using fasteners such as screws (not shown).

Figure 4:
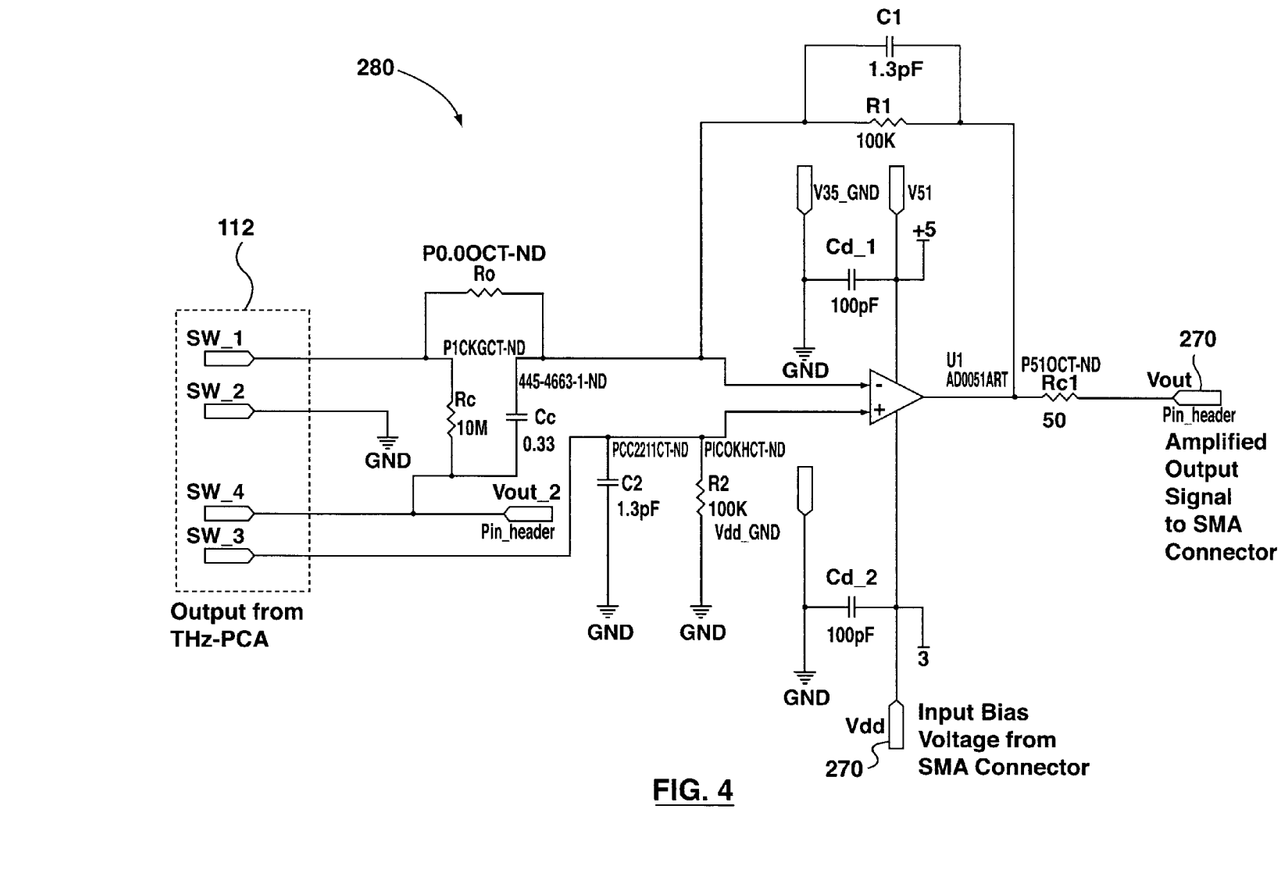
FIG. 4 is a schematic diagram of a pre-amplifier for use with the apparatus of FIG. 1.

The electrical connectors 270 transmit electrical signals between the terahertz photoconductive antenna 112 and the external electronics. For example, in the illustrated embodiment, there are two electrical connectors 270. When operating as a terahertz receiver, one electrical connector 270 is used to carry an electrical output signal that is proportional to the terahertz wave impinging the terahertz photoconductive antenna 112. The second electrical connector 270 can be used to amplify the output signal. More particularly, with reference to FIG. 4, the apparatus 100 may include a pre-amplifier 280 within the enclosure 110, and the second electrical connector 270 may apply an input voltage bias to the pre-amplifier 280. The pre-amplifier 280 is electrically connected to the terahertz photoconductive antenna 112, and may include one or more electrical components mounted to a circuit board such as operation amplifiers, resistors, and capacitors. FIG. 4 illustrates an exemplary Low Noise Amplifier (LNA) circuit. In other embodiments, the pre-amplifier could have other configurations.

In some embodiments, the electrical components of the pre-amplifier may be mounted to the same circuit board 142 as the terahertz dye 140, or alternatively, a separate circuit board mounted within the enclosure 110.

In some embodiments, the pre-amplifier 280 may be omitted, or may be located externally from the enclosure 110. In such cases, there may be only one electrical connector 270.

Furthermore, when operating as a terahertz transmitter, a single electrical connector 270 can be used. In this case, one electrical connector 270 is coupled to an external power supply in order to apply an input bias voltage to the terahertz photoconductive antenna 112 for generating terahertz waves.

Figure 5:
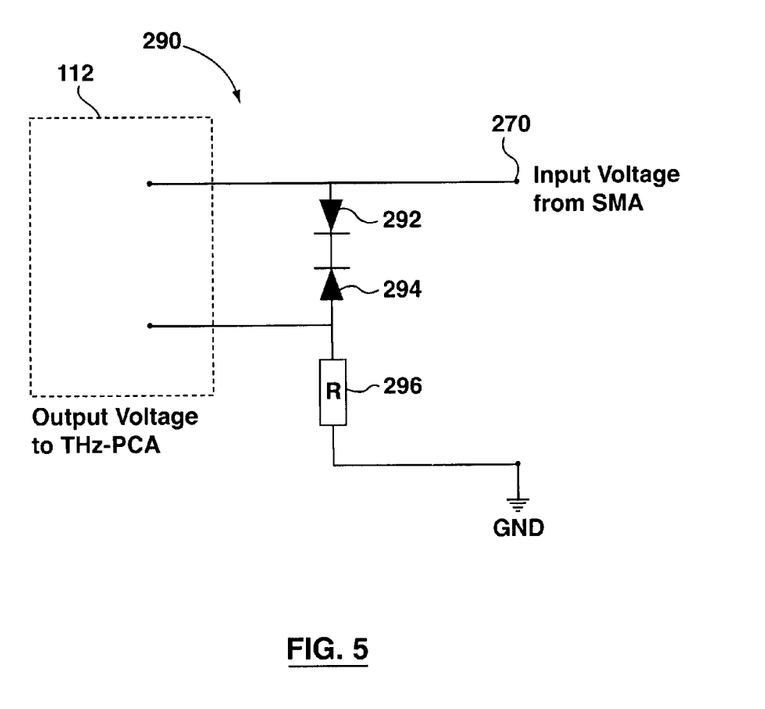
FIG. 5 is a schematic diagram of a voltage limit circuit for use with the apparatus of FIG. 1.

Referring now to FIG. 5, the apparatus 100 may include a voltage limit circuit 290, which may help protect the terahertz photoconductive antenna 112 from overvoltage damage when operating as a terahertz transmitter. As shown, the voltage limit circuit 290 is connected to one of the electrical connectors 270 for applying an input voltage. Furthermore, the voltage limit circuit 290 is also connected to the terahertz photoconductive antenna 112 for applying an output voltage to the terahertz photoconductive antenna 112.

In the illustrated embodiment, the voltage limit circuit 290 includes a forward biased diode 292, a reverse biased diode 294 connected in series with the forward biased diode 292, and a protective resistor 296. The protective resistor 296 is selected to have a resistance substantially lower than that of the terahertz photoconductive antenna 112. The reverse biased diode 294 is selected to have a break-through voltage approximately equal to the maximum voltage for the terahertz photoconductive antenna 112. As an example, the maximum voltage may be about 15V.

In operation, when the input voltage applied is less than the break-through voltage of the reverse biased diode 294 (e.g. less than 15V), the reverse biased diode 294 acts as an open circuit and the input voltage is approximate the same as the output voltage applied to the terahertz photoconductive antenna 112 (provided that the protective resistor 296 has an appropriately low resistance).

When the input voltage applied is greater than the break-through voltage of the reverse biased diode 294 (e.g. greater than 15V), some current will flow across both diodes 292, 294 and through the resistor 296. Furthermore, the voltage drop across the diodes 292, 294 will be approximately equal to the break-through voltage of the reverse biased diode 294 (e.g. 15V), and thus the voltage drop across the terahertz photoconductive antenna 112 will be about the same (e.g. 15V), thereby limiting the voltage applied to the terahertz photoconductive antenna 112.

Figure 6:
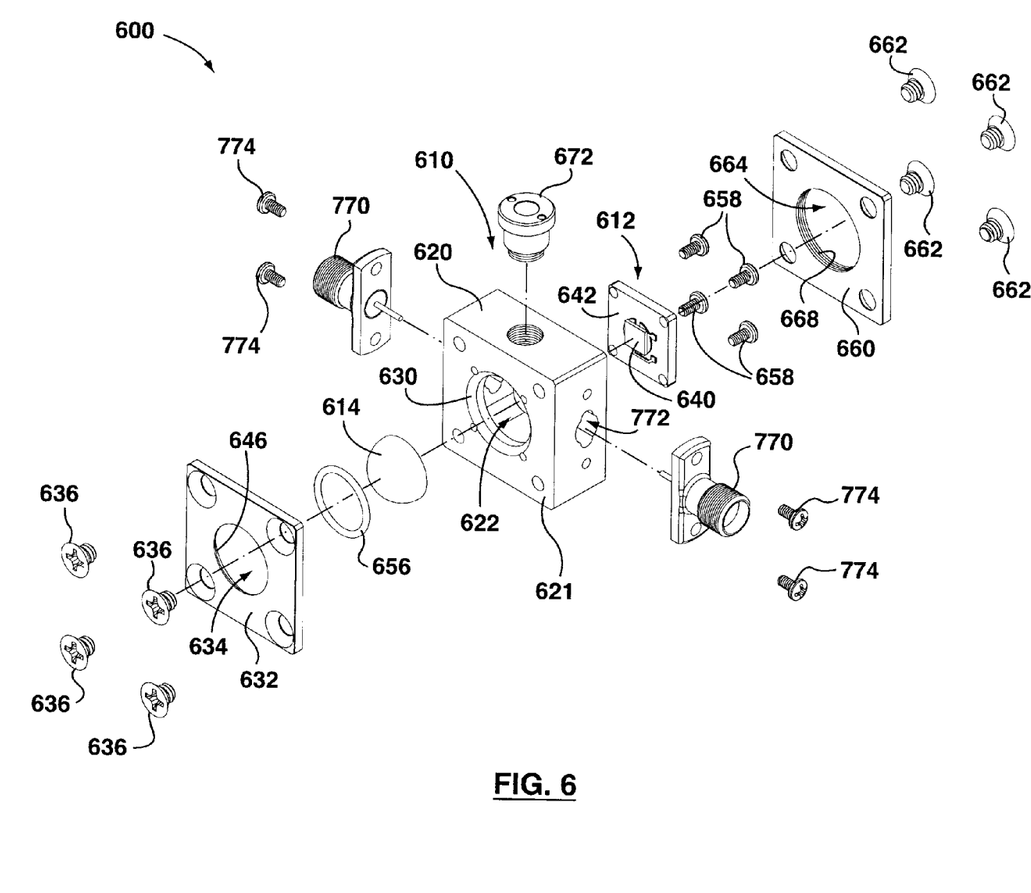
FIG. 6 is an exploded front perspective view of an apparatus for transmitting or receiving terahertz waves, and including an enclosure with a square cross-sectional shape according to another embodiment.
Figure 7:
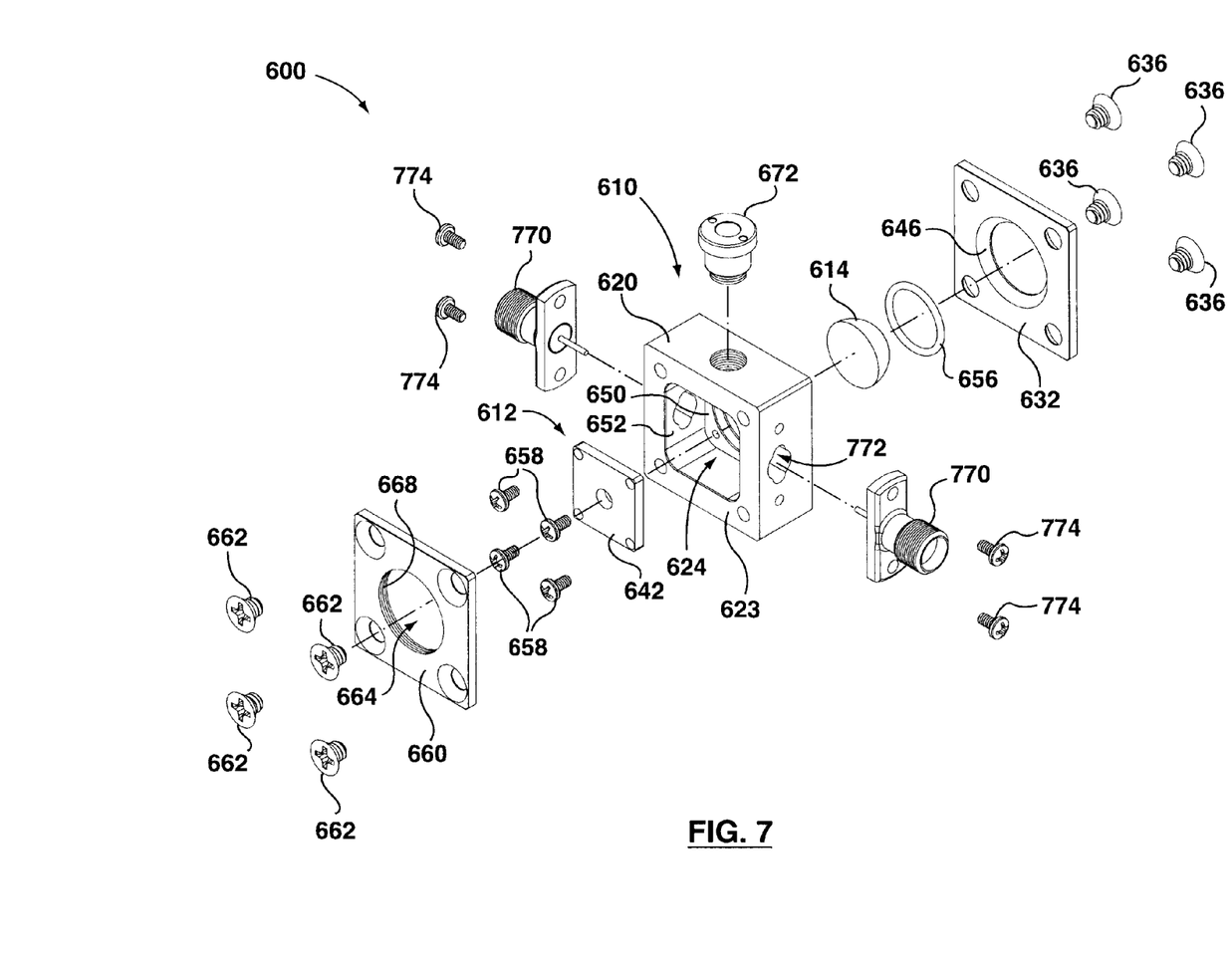
FIG. 7 is an exploded rear perspective view of the apparatus of FIG. 6.

Referring now to FIGS. 6 and 7, illustrated therein is an apparatus 600 for transmitting or receiving terahertz waves made in accordance with another embodiment of the present invention. The apparatus 600 is similar in some respects to the apparatus 100 and similar elements are given similar reference numerals incremented by five hundred. For example, the apparatus 600 includes an enclosure 610, a terahertz photoconductive antenna 612 (including a terahertz chip dye 640 and a circuit board 642), a terahertz lens 614, and electrical connectors 770.

One difference is that the enclosure 610 includes a main body 620 having a generally square cross-sectional shape. The main body 620 has a front portion 621 with a front opening 622 (shown in the front perspective view of FIG. 6), a rear portion 623 with a rear opening 624 (shown in the rear perspective view of FIG. 7), and an internal passageway that extends between the front opening 622 and the rear opening 624.

In this embodiment, the front portion 621 of the main body 620 has a front recessed portion 630 defining a lens mounting structure for mounting the terahertz lens 614 within the enclosure 610. More specifically, the front recessed portion 630 is shaped as a circumferential seat for receiving the hyper-hemispherical terahertz lens 614. Furthermore, the enclosure 610 includes a front cover 632 for holding the terahertz lens 614 against the front recessed portion 630. The front cover 632 has a front opening 634 smaller than the diameter of the terahertz lens 614, while still allowing terahertz waves to be transmitted or received by the terahertz photoconductive antenna 612. The front cover 632 may be secured to the main body 620 using fasteners such as screws 636. The apparatus 600 may also include an O-ring 656 located between the front cover 632 and the terahertz lens 614. Furthermore, as shown in FIG. 7, the front cover 632 may have a beveled rear inner wall 646 that presses the O-ring 656 against the terahertz lens 614. This configuration is generally sufficient to optical align the terahertz photoconductive antenna 612 and the terahertz lens 614 without the use of a position adjustment device such as set screws. In this case, the terahertz photoconductive antenna 612 and the terahertz lens 614 may be pre-aligned during manufacture and assembly within the enclosure 610.

Referring still to FIG. 7, the rear portion 623 of the main body 620 has a rear recessed portion 650 defining an antenna mounting structure for mounting the terahertz photoconductive antenna 612 within the enclosure 610. More specifically, the rear recessed portion 650 is a generally square-shaped interior flange located at the end of an interior wall 652 within the main body 620. The terahertz photoconductive antenna 612 may be held against the rear recessed portion 650 using fasteners such as screws 658 that extend through the circuit board 642 and into threaded apertures on the rear recessed portion 650.

As shown, the enclosure 610 may include a rear cover 660 secured to the main body 620 using a plurality of fasteners such as screws 662. The rear cover 660 generally has a rear opening 664 therethrough for allowing an optical beam to impinge the terahertz photoconductive antenna. Furthermore, the rear opening 664 may have internal threads 668 configured for attachment to an optical instrument such as another optical component or an optical bench. In other embodiments, the rear cover 660 may have other configurations. For example, the rear cover could be configured to be coupled to a fiber optic cable as will be described with respect to FIG. 8.

The main body 620 may also have one or more threaded openings 670 for attachment to optical instruments. As shown, the threaded opening 670 may be located on the top of the main body 620. Furthermore, the apparatus 600 may include an optical adapter 672 that screws into the threaded opening 670 for allowing attachment to optical instruments having a different size than the threaded opening 670. While the optical adapter 672 is shown as providing a reduced diameter threaded opening, other adapters could provide reduced diameter threaded openings.

As described above, the apparatus 600 also includes one or more electrical connectors 770 such as SMA connectors. As shown, the electrical connectors 770 extend through apertures 772 on the sides of the main body 620 for electrical connection to the circuit board 642 or other electrical components within the enclosure 110. As shown, the electrical connectors 770 may be secured to the main body 620 using fasteners such as screws 774.

Figure 8:
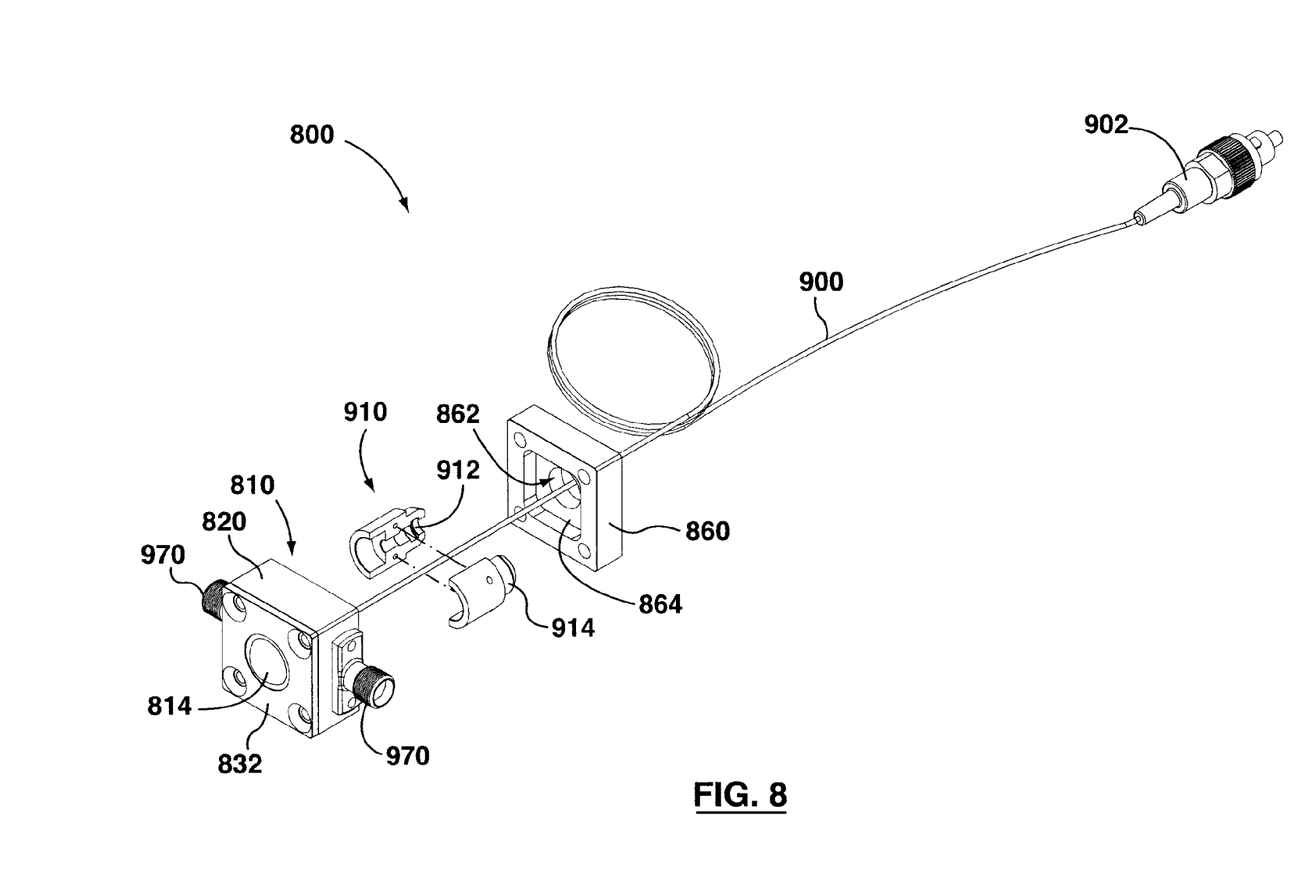
FIG. 8 is a partially exploded front perspective view of an apparatus for transmitting or receiving terahertz waves, and including a fiber optic cable attached to an enclosure according to another embodiment.
Figure 9:
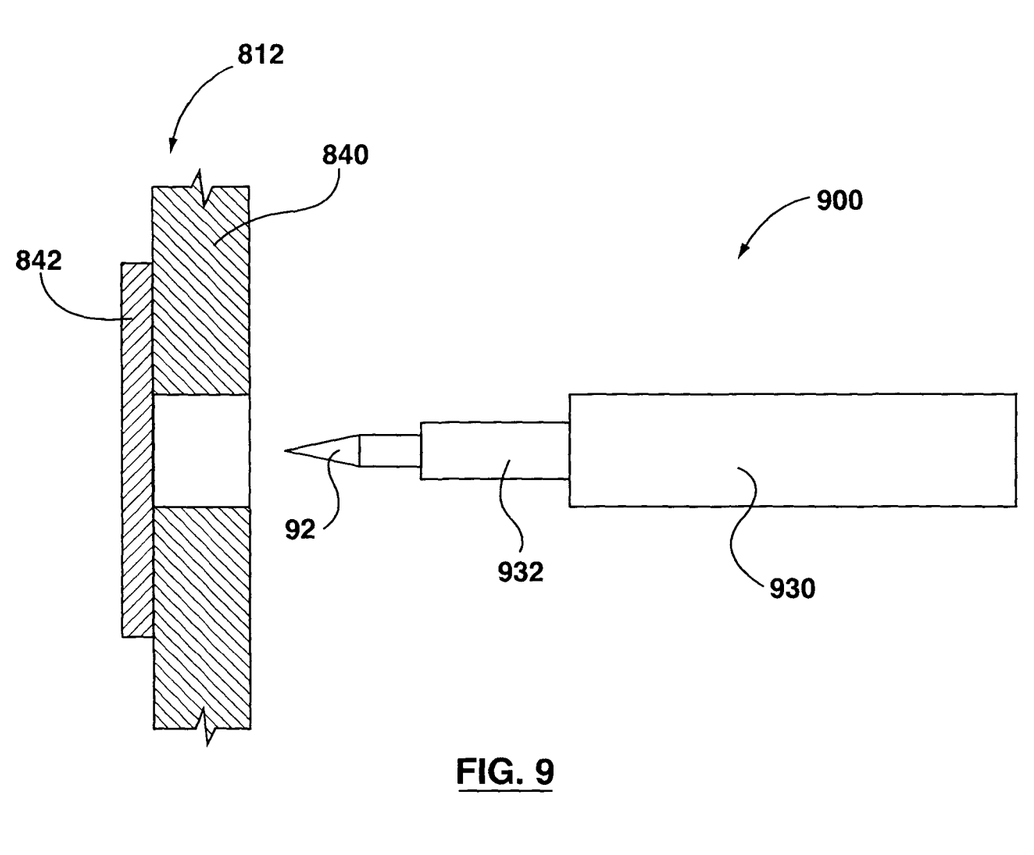
FIG. 9 is a schematic diagram of the fiber optic cable of the apparatus of FIG. 8.

Referring now to FIGS. 8 and 9, illustrated therein is an apparatus 800 for transmitting or receiving terahertz waves made in accordance with another embodiment of the present invention. The apparatus 800 is similar in many respects to the apparatus 600 and similar elements are given similar reference numerals incremented by two hundred. For example, the apparatus 800 includes an enclosure 810 having a main body 820 and a front cover 832, a terahertz photoconductive antenna 812 (shown in FIG. 9), a terahertz lens 814, and electrical connectors 970.

One difference is that the apparatus 800 includes a fiber optic cable 900 for directing an optical beam onto the terahertz photoconductive antenna 812. Furthermore, the enclosure 610 includes a rear cover 860 that is configured to receive the fiber optic cable 900. More specifically, the rear cover 860 has an opening 862 shaped to receive a strain relief member 910 that is coupled to the fiber optic cable 900. As shown, the strain relief member 910 has a two-piece construction that is configured to clamp onto the fiber optic cable 900. Epoxy or another adhesive may help secure the strain relief member 910 to the cable 900. Furthermore, the strain relief member 910 may have an undercut that allows for expansion of the epoxy during curing. Once attached to the fiber optic cable 900, the strain relief member 910 secures the cable 900 to the enclosure 810, and specifically, the rear cover 860. This can help keep the tip of the cable 900 aligned with the terahertz photoconductive antenna 812.

As shown, the strain relief member 910 may have a rear portion 912 of reduced diameter that is shaped to fit within the opening 862 on the rear cover 860. This may be a friction fit in order to secure the strain relief member 910 in place. The strain relief member 910 could also be secured in place using an adhesive such as epoxy.

In some embodiments, the strain relief member 910 may be sized and shaped to extend from the rear cover 860 to the circuit board of the terahertz photoconductive antenna 812 and may maintain contact therewith. This may help position the tip of the fiber optic cable 900 longitudinally within the enclosure 810, and thereby align the fiber optic cable 900 with the terahertz chip dye. In such cases, the rear cover 860 may have an interior recessed portion 864 for receiving a portion of the strain relief member 910.

Referring now to FIG. 9, the fiber optic cable 900 includes an optical fiber 920 and a rigid jacket 930 wrapped around an optical fiber 920 within the enclosure 810. The jacket 930 may be made from a metal such as stainless steel. The jacket 930 may be added before, during, or after the strain relief member 910 is clamped onto the fiber optic cable 900.

In some embodiments, the fiber optic cable 900 may also include a tapered tip 924, which may have an optical focal point aligned on the terahertz chip dye 842 of the terahertz photoconductive antenna 812. As shown, the tapered tip 924 may be spaced apart from the terahertz chip dye 842. Furthermore, the fiber optic cable 900 may include a ferrule 932 between the rigid jacket 930 and the tapered tip 924.

Figure 10:
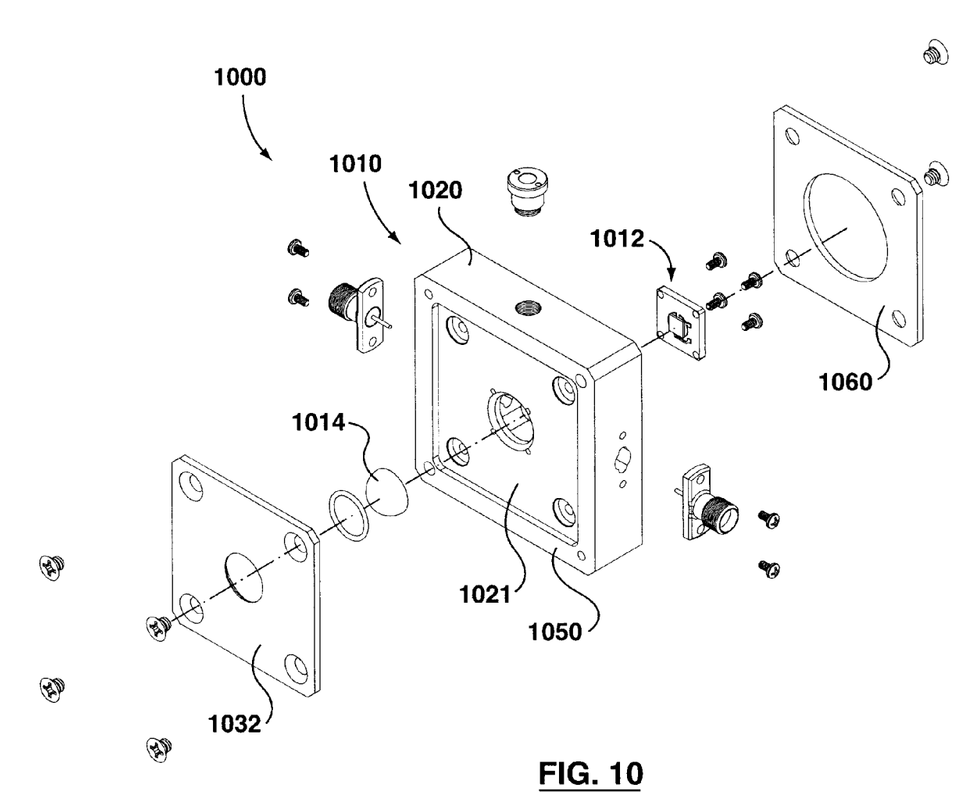
FIG. 10 is an exploded front perspective view of an apparatus for transmitting or receiving terahertz waves according to another embodiment.

Referring now to FIG. 10, illustrated therein is an apparatus 1000 for transmitting or receiving terahertz waves made in accordance with another embodiment of the present invention. The apparatus 1000 is similar in many respects to the apparatus 600 and similar elements are given similar reference numerals incremented by four hundred. For example, the apparatus 1000 includes an enclosure 1010 (including a main body 1020, a front cover 1032, and a rear cover 1060), a terahertz photoconductive antenna 1012, a terahertz lens 1014, and electrical connectors 1170.

One difference is that the enclosure 1010 is generally larger than the enclosure 610 of the apparatus 600. Specifically, the enclosure 1010 is about twice the size of the enclosure 610. For example, the enclosure 610 may be about 1-inch by 1-inch, and the enclosure 1010 may be about 2-inches by 2-inches. Having different sizes enables attachment to various types of terahertz transmission or detection systems.

Another difference is that the front portion 1021 of the main body 1020 has an outer peripheral flange 1050 that defines an interior recess sized and shaped to receive the front cover 1032 therein. While not shown, the rear portion of the main body 1020 may also have an outer peripheral flange that defines an interior recess sized and shaped to receive the rear cover 1060 therein. This may provide a slim profile without exposed edges.

One or more of the embodiments described herein are capable of integrating THz-PCAs, terahertz lenses (e.g. hyper-hemispherical silicon lenses), and other optical components (such as optical lenses and optical fibers) within a single enclosure package. The enclosure is generally configured to optically align the THz-PCA and the terahertz lens, and thus, may allow for optimum operation. The enclosure may enable assembly of components in a repeatable and accurate fashion while also being simple and inexpensive. In some cases, the enclosure may be ruggedized and may withstand breakage during normal usage, particularly for industrial applications. In some cases, the enclosure may be sealed, for example, using O-rings. This may provide resistance to damage from water, dust, or other elements that are sometimes present within industrial environments.

While the above description provides examples of one or more apparatus, methods, or systems, it will be appreciated that other apparatus, methods, or systems may be within the scope of the present description as interpreted by one of skill in the art.

The invention claimed is:

1. An apparatus for transmitting or receiving terahertz waves, the apparatus comprising:
   (a) an enclosure having a front opening, a rear opening, and an internal passageway therebetween, the enclosure including an antenna mounting structure and a lens mounting structure;
   (b) a terahertz photoconductive antenna mounted within the enclosure against the antenna mounting structure, the terahertz photoconductive antenna having a rear side for being optically energized by an optical beam passing through the rear opening of the enclosure, and a front side for transmitting or receiving the terahertz waves through the front opening;
   (c) a terahertz lens mounted within the enclosure against the lens mounting structure, the terahertz lens being positioned between the front opening and the terahertz photoconductive antenna for converging the terahertz waves being transmitted or received;
   (d) wherein the antenna mounting structure and the lens mounting structure are configured to optically align the terahertz photoconductive antenna and the terahertz lens; and
   (e) a position adjustment device for optically aligning the terahertz photoconductive antenna and the terahertz lens.

2. The apparatus of claim 1, wherein the position adjustment device includes a plurality of set screws for adjustably positioning the antenna mounting structure within the enclosure.

3. The apparatus of claim 1, wherein the position adjustment device includes a plurality of set screws for adjustably positioning the lens mounting structure within the enclosure.

4. An apparatus for transmitting or receiving terahertz waves, the apparatus comprising:
   (a) an enclosure having a front opening, a rear opening, and an internal passageway therebetween, the enclosure including an antenna mounting structure and a lens mounting structure;
   (b) a terahertz photoconductive antenna mounted within the enclosure against the antenna mounting structure, the terahertz photoconductive antenna having a rear side for being optically energized by an optical beam passing through the rear opening of the enclosure, and a front side for transmitting or receiving the terahertz waves through the front opening; and
   (c) a terahertz lens mounted within the enclosure against the lens mounting structure, the terahertz lens being positioned between the front opening and the terahertz photoconductive antenna for converging the terahertz waves being transmitted or received;
   (d) wherein the antenna mounting structure and the lens mounting structure are configured to optically align the terahertz photoconductive antenna and the terahertz lens; and
   (e) wherein the terahertz photoconductive antenna includes a terahertz chip dye mounted to a circuit board, and wherein the antenna mounting structure and the lens mounting structure are configured to position the terahertz lens in contact with the terahertz chip dye, and wherein the enclosure includes a tubular main body with a front portion, and wherein the antenna mounting structure and the lens mounting structure are located within the front portion of the tubular main body with the lens mounting structure being located forwardly of the antenna mounting structure, and wherein the antenna mounting structure has a cylindrical shape with a longitudinal passageway and a recessed front portion for receiving the circuit board, and wherein the lens mounting structure has a cylindrical shape with a longitudinal passageway and a beveled rear inner wall for holding the terahertz lens against the terahertz chip dye.

5. The apparatus of claim 4, further comprising an O-ring between the beveled rear inner wall of the lens mounting structure and the terahertz lens.

6. The apparatus of claim 4, wherein the tubular main body has an inner annular flange for supporting the antenna mounting structure.

7. The apparatus of claim 6, further comprising a front lock ring for securing the lens mounting structure and the antenna mounting structure between the front lock ring and the inner annular flange of the tubular main body.

8. An apparatus for transmitting or receiving terahertz waves, the apparatus comprising:
   (a) an enclosure having a front opening, a rear opening, and an internal passageway therebetween, the enclosure including an antenna mounting structure and a lens mounting structure,
   (b) a terahertz photoconductive antenna mounted within the enclosure against the antenna mounting structure, the terahertz photoconductive antenna having a rear side for being optically energized by an optical beam passing through the rear opening of the enclosure, and a front side for transmitting or receiving the terahertz waves through the front opening;
   (c) a terahertz lens mounted within the enclosure against the lens mounting structure, the terahertz lens being positioned between the front opening and the terahertz photoconductive antenna for converging the terahertz waves being transmitted or received;
   (d) wherein the antenna mounting structure and the lens mounting structure are configured to optically align the terahertz photoconductive antenna and the terahertz lens; and
   (e) an optical focusing lens assembly mounted within the enclosure for directing the optical beam onto the terahertz photoconductive antenna, and wherein the optical focusing lens assembly is movable lengthwise within the enclosure for providing an adjustable distance between the optical focusing lens assembly and the terahertz photoconductive antenna, and wherein the enclosure includes a tubular main body with a rear portion having internal threads, and wherein the optical focusing lens assembly has a tubular lens housing with external threads for engaging the internal threads of the tubular main body so as to allow lengthwise movement.

9. The apparatus of claim 8, further comprising a middle lock ring and a rear lock ring for securing the optical focusing lens assembly in place within the tubular main body.

10. The apparatus of claim 8, wherein the optical focusing lens assembly further includes:
    (a) an optical focusing lens; and
    (b) a retaining ring for securing the optical focusing lens to the tubular lens housing.

11. The apparatus of claim 10, further comprising a fiber optic coupler mounted to the tubular lens housing for receiving a fiber optic cable that supplies the optical beam through the optical focusing lens and onto the terahertz photoconductive antenna.

12. The apparatus of claim 11, wherein the fiber optic coupler includes a collimating lens for collimating the optical beam onto the optical focusing lens.

13. An apparatus for transmitting or receiving terahertz waves, the apparatus comprising:
    (a) an enclosure having a front opening, a rear opening, and an internal passageway therebetween, the enclosure including an antenna mounting structure and a lens mounting structure;
    (b) a terahertz photoconductive antenna mounted within the enclosure against the antenna mounting structure, the terahertz photoconductive antenna having a rear side for being optically energized by an optical beam passing through the rear opening of the enclosure, and a front side for transmitting or receiving the terahertz waves through the front opening; and
    (c) a terahertz lens mounted within the enclosure against the lens mounting structure, the terahertz lens being positioned between the front opening and the terahertz photoconductive antenna for converging the terahertz waves being transmitted or received;
    (d) wherein the antenna mounting structure and the lens mounting structure are configured to optically align the terahertz photoconductive antenna and the terahertz lens; and
    (e) wherein the enclosure includes:
        (i) a main body having a rear recessed portion defining the antenna mounting structure, and a front recessed portion defining the lens mounting structure; and
        (ii) a front cover for holding the terahertz lens against the front recessed portion of the main body, the front cover having a front opening therethrough.

14. The apparatus of claim 13, further comprising an O-ring located between the front cover and the terahertz lens.

15. The apparatus of claim 13, wherein the enclosure includes a rear cover secured to the main body using a plurality of fasteners, the rear cover having a rear opening therethrough.

16. The apparatus of claim 15, wherein the rear opening in the rear cover has internal threads configured for attachment to an optical instrument.

17. The apparatus of claim 15, further comprising a fiber optic cable mounted to the rear cover for directing the optical beam onto the terahertz photoconductive antenna.

18. The apparatus of claim 17, further comprising a strain relief member for attaching the fiber optic cable to the rear cover.

19. The apparatus of claim 18, wherein the terahertz photoconductive antenna includes a terahertz chip dye mounted to a circuit board, and wherein the fiber optic cable includes:
    (a) an optical fiber having a tapered tip spaced apart from the terahertz chip dye; and
    (b) a rigid jacket wrapped around the optical fiber.

* * * * *